(12) United States Patent
Boss et al.

(10) Patent No.: US 8,826,420 B2
(45) Date of Patent: Sep. 2, 2014

(54) DYNAMIC ACCOUNT PROVISIONS FOR SERVICE DESK PERSONNEL

(75) Inventors: Gregory Jensen Boss, American Fork, UT (US); Andrew R. Jones, Round Rock, TX (US); Kevin C. McConnell, Austin, TX (US); Ori Pomerantz, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2434 days.

(21) Appl. No.: 11/549,728

(22) Filed: Oct. 16, 2006

(65) Prior Publication Data

US 2008/0091983 A1 Apr. 17, 2008

(51) Int. Cl.
*G06F 7/04* (2006.01)

(52) U.S. Cl.
USPC .............................. 726/21; 709/225; 709/229

(58) Field of Classification Search
USPC ............ 714/48; 726/22–24, 21; 709/225, 229
See application file for complete search history.

(56) References Cited

U.S. PATENT DOCUMENTS

| | | | |
|---|---|---|---|
| 6,353,446 B1 | 3/2002 | Vaughn et al. | |
| 6,381,587 B1 | 4/2002 | Guzelsu | |
| 6,477,531 B1 * | 11/2002 | Sullivan et al. | 707/10 |
| 6,604,085 B1 | 8/2003 | Kolls | |
| 6,697,969 B1 * | 2/2004 | Merriam | 714/46 |
| 6,785,834 B2 | 8/2004 | Chefalas et al. | |
| 6,792,462 B2 * | 9/2004 | Bernhardt et al. | 709/225 |
| 6,845,394 B2 | 1/2005 | Ritche | |
| 2002/0123983 A1 | 9/2002 | Riley et al. | |
| 2005/0081079 A1 | 4/2005 | Cheston et al. | |
| 2005/0097396 A1 | 5/2005 | Wood et al. | |
| 2008/0091983 A1 * | 4/2008 | Boss et al. | 714/48 |

OTHER PUBLICATIONS

Naik, V.K.;et al; "An architecture for the coordination of system management services"; IBM Systems Journal; vol. 43 , Issue: 1; Digital Object Identifier: 10.1147/sj.431.0078; Publication Year: 2004 , pp. 78-96.*

* cited by examiner

*Primary Examiner* — Pramila Parthasarathy
*Assistant Examiner* — Angela Holmes
(74) *Attorney, Agent, or Firm* — Jeffrey S. LaBaw; Darcell Walker (57) ABSTRACT

The present invention describes an automated process that enables dynamic provisioning (both creation and deletion) of administrative accounts based upon a real-time need as defined by service desk processes and procedures. This invention enhances current provisioning of administrative account processes that are typically handled by service desk personnel that constantly turnover through firings and hirings. By creating an on-demand provisioning process on a strictly as-needed basis an enhanced security structure is created. In addition, audit ability of access can be added to the processes that provides accountability and traceability of activities that can be directly related back to actual business justifications (the initial problem report) for actions (important not only in ITIL but also regulatory requirements).

17 Claims, 7 Drawing Sheets

DYNAMIC ACCOUNT PROVISIONS FOR SERVICE DESK PERSONNEL

FIELD OF THE INVENTION

The present invention generally relates to computer diagnostic systems and more specifically to a method and system for limiting access of computer diagnostic system resources when source resources are not in use.

BACKGROUND OF THE INVENTION

A "Service Desk" is a primary tool for information technology (IT) service management and customer support. The service desk is intended to provide a single point of contact ("SPOC") to meet the communications needs of both users and IT and to satisfy both customer and IT provider objectives. Many organizations have implemented a central point of contact for handling customer, user and related issues. This function is known under several titles often interpreted as having increasing levels of business relevance, including a call center, service center and help desk.

The IT infrastructure library approach to a service desk acts as the central point of contact between service providers and users/customers, on a day-to-day basis. It is also a focal point for reporting Incidents and for users making service requests. It handles incidents and service requests, as well as providing an interface, with users, for other service management activities such as change, problem, configuration, release, service level and IT service continuity management.

The service desk pro-actively keeps users informed of all relevant service events, actions and service changes that are likely to affect them. The service desk is in the direct line of any impact on the "service level" agreement and as such should be kept rapidly informed of any planned or unexpected changes or service unavailability.

In current practice, service desk applications typical consist of some combination of the following components: (1) call center automation—The call center automation component handles interactions between end users and service desk analysts. Traditionally it focuses on telephone call, but it may include any interaction mechanism such as email and instant message; (2) incident reporting and tracking—The incident reporting system tracks incident reports—often referred to as trouble tickets—from their creation to resolution. The basic life cycle of an incident is (a) registration, (b) evaluation, and (c) fulfillment; (3) problem determination aids—problem diagnostics aids consist of a diagnostics system that uses one or more diagnostic paradigms. Examples of diagnostic paradigms include keyword matching, full text search, decision trees, and artificial intelligence techniques; (4) integration with network and system monitoring applications—Automated systems that monitor the state of an IT environment are often integrated with the incident tracking system. Such systems create incident reports when they detect fault conditions in the environment; (5) asset management systems—The asset management system provides reasonable current information about the state of the environment that can be utilized by other components; (6) change management systems—The change management system manages the approval process for changes to the IT environment. It may also track the implementations of the changes. In the context of a service desk, this may be limited to changes required to implement solutions to a problem; (7) service management systems—The service management system handles the dispatch and tracking of service personnel required to implement a problem solution.

The diagnostic system has knowledge about potential problems and their solutions. Such knowledge typically comes from three sources: (1) predefined knowledge provided by a third party. This knowledge is generally tied to a specific type of resource such as a specific vendor database. It does not take into account any of the specific characteristics of a given installation, thus it may be used without change by any installation that has the same resource type to which it pertains. (2) site-specific knowledge. This knowledge is similar in structure to the predefined knowledge, but it is created to reflect a specific operating environment. Because of this it can take into account know configurations and relationships in the environment. (3) historic knowledge. This is the result of previous successful problem diagnoses. It can be thought of as learning from experience.

Analyzing symptoms described in a problem ticket and obtained by further interaction with the user submitting the ticket uses the knowledge. Essentially the diagnostic process attempts to create an accurate enough picture of the state of the environment such that only a single solution applies.

The service desk function has been standardized, which makes it easier to outsource service desks. Today, many service desk personnel are assigned accounts on servers that they manage, often times with more authorities than they actually require to do their job due to limitations in permissions within a product. While these accounts should only be used during actual problem resolution activities, these outsourcing conditions create security exposures because these accounts are always available and are constantly being accessed.

When service desk activities are outsourced, multiple companies will outsource these functions to the same service desk organization. Although information for different organizations may be located in different locations, the service desk personnel can have constant access to all servers. This access even when there is no specific and pending service desk issue creates this security risk.

There remains a need for a service desk method and system to protect against unnecessary access to data in situations where account data is stored in a system containing data from multiple organizations. There is also a need for a method and system that minimizes security exposure through dynamic account creation and destruction.

SUMMARY OF THE INVENTION

The present invention describes an automated process that enables dynamic provisioning (both creation and deletion) of administrative accounts based upon a real-time need as defined by service desk processes and procedures. This invention enhances current provisioning of administrative account processes that are typically handled by service desk personnel that constantly turnover through firings and hirings. By creating an on-demand provisioning process on a strictly as-needed basis an enhanced security structure is created. In addition, audit ability of access can be added to the processes that provides accountability and traceability of activities that can be directly related back to actual business justifications (the initial problem report) for actions (important not only in ITIL but also regulatory requirements).

The system of the present invention enables a user to submit a service request to the system via an input/output device. This input/output device communicates with the service desk system via a communication network. The service desk system comprises service personnel and one or more servers for each organization serviced by the service desk system. The service desk personnel can be in communication with the user via the communication network. The service desk personnel also have access to the information in each server in order to assist the user. The system of the present invention also has a security mechanism in place to monitor and control access to information in the various servers. The security mechanism allows access on to server information only as needed to respond to an incident report received at the service desk.

The method of the present invention provides protected access to account information in the service desk system. With this method, service desk personnel will only have access to information related to a particular incident report submitted by a user. Once the incident report is received, the user is identified and the server containing the user's information is identified and opened to allow access to the user information. The remaining accounts and information remain inaccessible. Once the user problem is identified and resolved, access to the user information is closed. In this system, access to information is normally in a closed state. The user account information is only opened and accessible when there is an incident report from the user of that account.

DETAILED DESCRIPTION OF THE INVENTION

Figure 1:
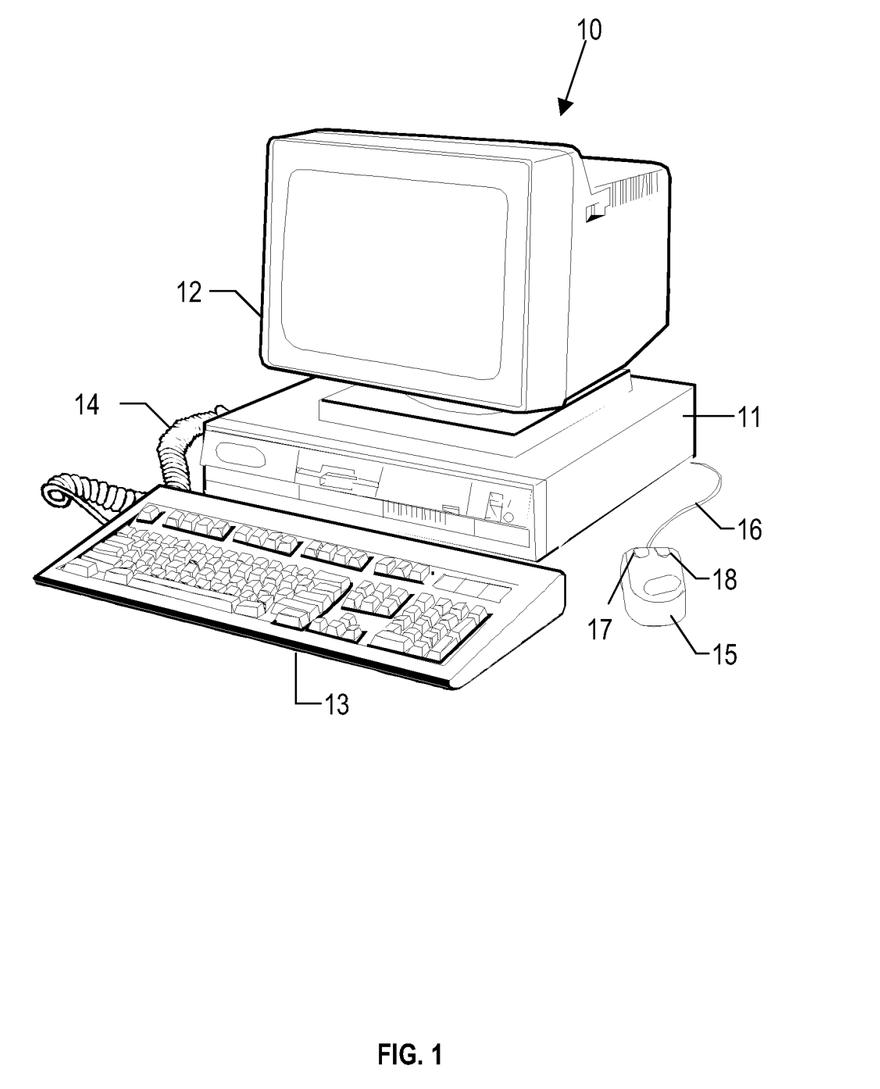
FIG. 1 is a conventional computing device used for communication between users in a chat room environment via a computer network.

Electronic mail message transmissions occur over computing devices, usually personal computers, connected to a communication network. With reference now to FIG. 1, there is depicted a pictorial representation of computing device 10 which may be used in implementation of the present invention. Although the invention is described in terms of the device illustrated in FIG. 1, other types of electronic devices capable of transmitting and receiving information can be used in the implementation of the present invention. As seen in FIG. 1, data processing system 10 includes processor 11 that preferably includes a graphics processor, memory device and central processor (not shown). Coupled to processor 11 is video display 12 which may be implemented utilizing either a color or monochromatic monitor, in a manner well known in the art. Also coupled to processor 11 is keyboard 13. Keyboard 13 preferably comprises a standard computer keyboard, which is coupled to the processor by means of cable 14. Also coupled to processor 11 is a graphical pointing device, such as mouse 15. Mouse 15 is coupled to processor 11, in a manner well known in the art, via cable 16. As is shown, mouse 15 may include left button 17, and right button 18, each of which may be depressed, or "clicked", to provide command and control signals to data processing system 10. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 10 may be implemented utilizing a personal computer.

The method of the present invention may be implemented in a global computer network environment such as the Internet. With reference now FIG. 2, there is depicted a pictorial representation of a distributed computer network environment 20 in which one may implement the method and system of the present invention. As may be seen, distributed data processing system 20 may include a plurality of networks, such as Local Area Networks (LAN) 21 and 22, each of which preferably includes a plurality of individual computers 23 and 24, respectively. Of course, those skilled in the art will appreciate that a plurality of Intelligent Work Stations (IWS) coupled to a host processor may be utilized for each such network. Any of the processing systems may also be connected to the Internet as shown. As is common in such data processing systems, each individual computer may be coupled to a storage device 25 and/or a printer/output device 26. One or more such storage devices 25 may be utilized, in accordance with the method of the present invention, to store the various data objects or documents which may be periodically accessed and processed by a user within distributed data processing system 20, in accordance with the method and system of the present invention. In a manner well known in the prior art, each such data processing procedure or document may be stored within a storage device 25 which is associated with a Resource Manager or Library Service, which is responsible for maintaining and updating all resource objects associated therewith.

Figure 2:
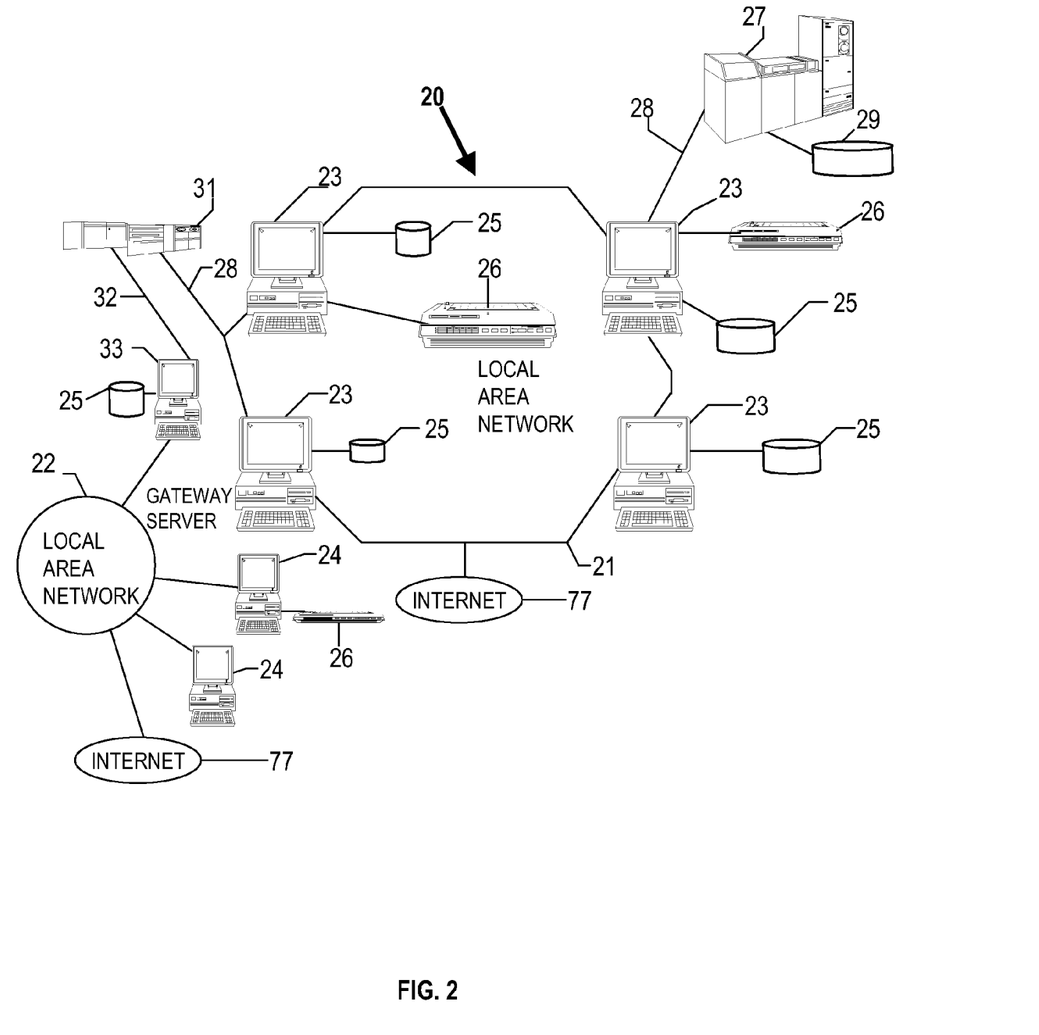
FIG. 2 is a diagram of a computer network over which messages may be transmitted between a user and the reservation center of the present invention.

Still referring to FIG. 2, it may be seen that distributed data processing system 20 may also include multiple mainframe computers, such as mainframe computer 27, which may be preferably coupled to Local Area Network (LAN) 21 by means of communications link 28. Mainframe computer 27 may also be coupled to a storage device 29 which may serve as remote storage for Local Area Network (LAN) 21. A second Local Area Network (LAN) 22 may be coupled to Local Area Network (LAN) 21 via communications controller 31 and communications link 32 to a gateway server 33. Gateway server 33 is preferably an individual computer or Intelligent Work Station (IWS), which serves to link Local Area Network (LAN) 22 to Local Area Network (LAN) 21. As discussed above with respect to Local Area Network (LAN) 22 and Local Area Network (LAN) 21, a plurality of data processing procedures or documents may be stored within storage device 29 and controlled by mainframe computer 27, as Resource Manager or Library Service for the data processing procedures and documents thus stored. Of course, those skilled in the art will appreciate that mainframe computer 27 may be located a great geographical distance from Local Area Network (LAN) 21 and similarly Local Area Network (LAN) 21 may be located a substantial distance from Local Area Network (LAN) 24. That is, Local Area Network (LAN) 24 may be located in California while Local Area Network (LAN) 21 may be located within Texas and mainframe computer 27 may be located in New York.

Figure 3:
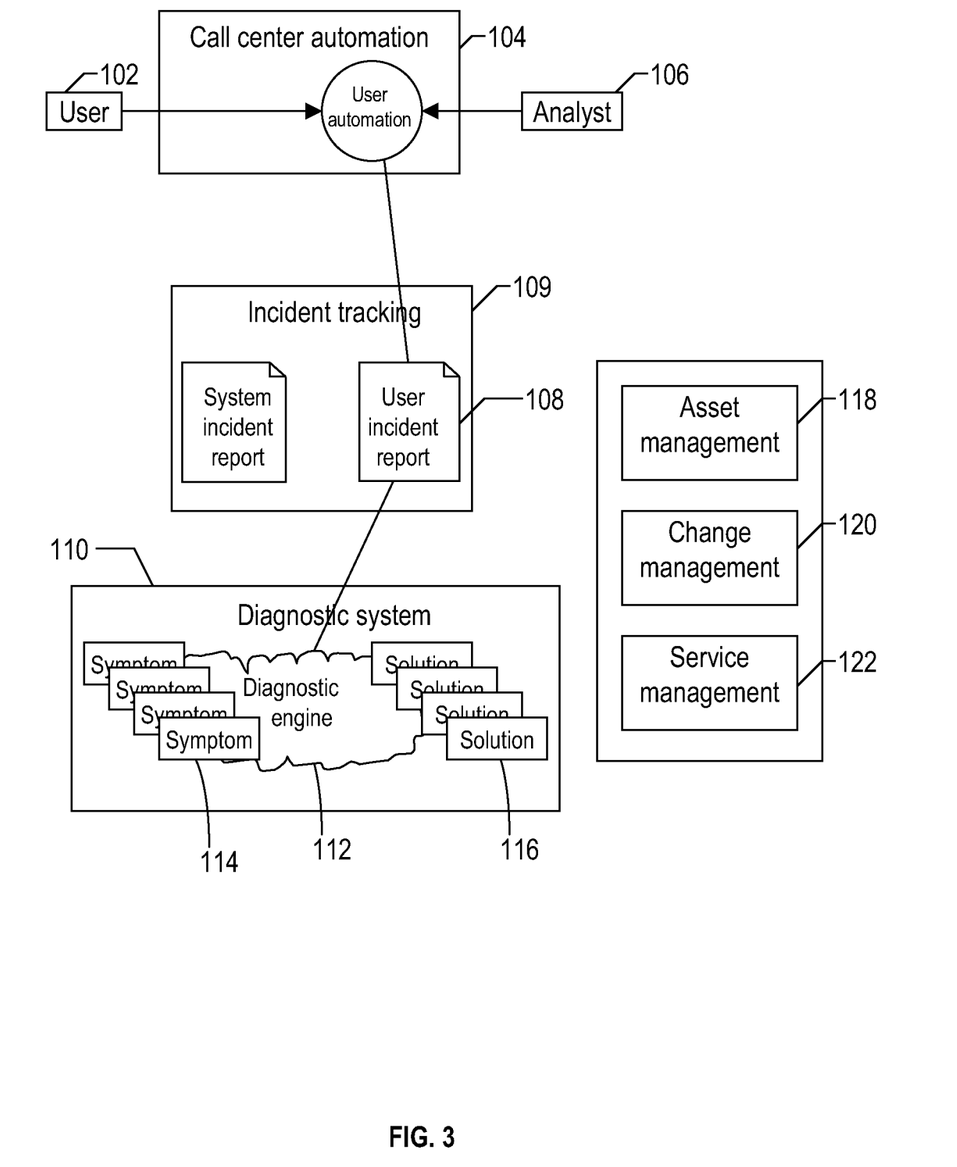
FIG. 3 is an illustration of a conventional service desk system configuration

FIG. 3 illustrates a monitoring system that is implemented in current service desk practices. This approach utilizes automated tools to filter and condition the information. This process can be implemented by means of a service desk diagnostic system. The solution to certain problems involves generating an event for consumption by the automated system. This involves pre populating the service desk diagnostic system with "knowledge" that describes states of interest, which may be used by automated tools and are like candidates for end user observation. When a problem diagnosis process selects one of these states as the "solution" to a problem, an event is automatically generated. Information gathered during the diagnosis process may be added to the event. This allows a generic state description to be tailored to describe a specific failure. If the diagnostic system does not support automatic actions as part of problem resolution, then an analyst may manually generate an event.

Referring to FIG. 3, a user 102 encounters problems when attempting to perform tasks in an information technology (IT) environment and reports the problems to the automated call center "service desk" 104 in the form of incident reports or trouble tickets 108. In the current practice, these reports are not correlated with monitoring performed by automated systems. In reality, the observations of end users are not considered valuable to automated monitoring systems for two reasons: (1) Many, quite possibly most, trouble tickets opened by users do not pertain to the core systems with which automated monitoring systems are typically concerned. (2) User observations are often imprecise and difficult for automated monitoring systems to utilize.

The incident report 108 is fed to a diagnostic engine 112 in a diagnostic system 110. Analysis of the incident report, in the incident-tracking module 109, identifies symptoms that may indicate causes of the problems. The symptoms in the incident report 108 are compared against a list of symptoms 114 in the diagnostic system 110. This comparison can result in a match between the identified symptom(s) in the incident report and the list of symptoms 114. A solution 116 for the symptoms 114 observed is then submitted to other systems, such as asset management system 118, change management system 120, and service management system 122. As mentioned, an automatic solution can be generated for a known problem identified in the diagnostic engine. However, a manual solution involving an analyst 106 will be required when there is no identified automatic solution.

Figure 4:
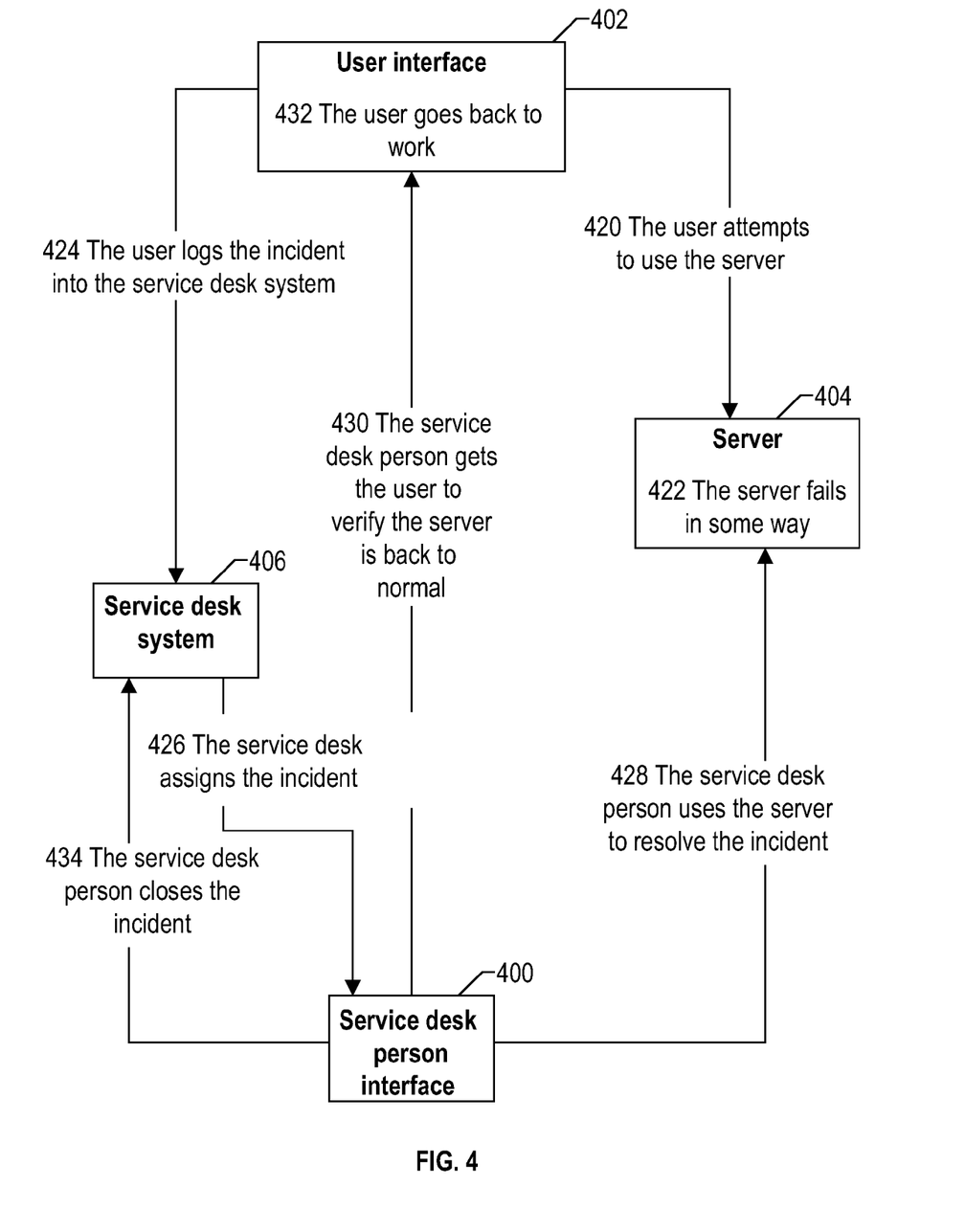
FIG. 4 is a convention configuration of the interaction between components of a service desk system.

FIG. 4 depicts a conventional configuration that may exist today for a service desk system that can process incident tickets. New service desk personnel interact on the system through a service desk interface 400 and are given administrative accounts that enable the personnel to access user information in existing server(s) 404. Through the user interface 402 the user communicates with service desk personnel through the service desk system interface 406 and the service desk personnel interface 400. According to the best security practices, each service desk person should have his or her own account to access each system. Each service desk person has an individual account that facilitates auditing and accountability.

In a conventional service desk system, in the initial step 420, the user attempts to perform some task in the system. In this effort, the user connects to server 404. However in step 422, the server fails in some way (does not give permission, is too slow, etc.). In step 424 the user 402 logs an incident into the service desk system 406 (via phone call, e-mail, Web form, etc.). At this point in step 426 the automated system assigns the call to a service desk person through interface 400. In step 428, the service desk person accesses the server 404 to resolve the incident. At the completion of the activity required to resolve the incident, in step 430, the service desk person has the user verify the incident has been resolved and that the server is again operating in a normal manner. With the incident resolved, in step 432, the user goes back to work. In step 434, the service desk person closes the incident. However, in this service desk implementation, the service desk personnel 400 may also have access to the server 404 when there is no pending incident report to address. This access when there is no pending incident report creates a security risk for the exposed server.

Figure 5:
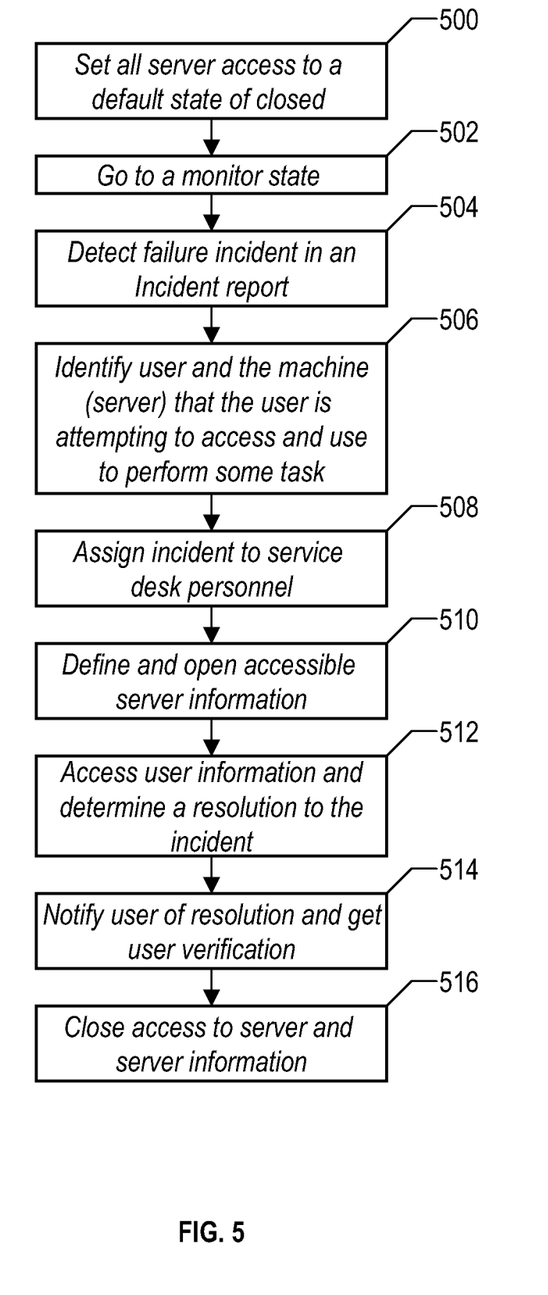
FIG. 5 is flow diagram of the steps in the implementation of the method of the present invention.

FIG. 5 is flow diagram of the steps in the implementation of the method of the present invention. As mentioned, the method of this invention provides a security against access to server machines and user information when there is no pending incident report to address. The initial step 500 sets all server access capabilities to a closed access state. In this default state, service desk personnel cannot access any server or user information without there being a pending incident report to resolve. After setting the access state to a default state, in step 502, the system goes into a monitor mode and awaits any incident reports. After a user has attempted to perform some task in the information technology (IT) environment and has encountered problems, the user files an incident report with the service desk system. In step 504, the service desk system detects the filed incident report. At this point, in step 506, the service desk system processes the report and identifies system user filing the report. As part of this identification process, the user is identified and the server or machine, which the user accessed in the attempt to perform the task, can be identified. In addition, the service desk system may also identify the task that the user was attempting to perform.

After the identification of the user, step 508 assigns the incident to a service desk representative. This representative may be responsible for the particular machine/server that the user attempted to use. The representative may also be responsible for the particular organization of the user. Step 510 then defines and opens access to the machine for the service desk representative. This access is determined by the information included in the incident report filed by the user. For example, if the user was from company ABC and company ABC had information on server 404, then access would be granted to allow the service desk representative to access server 404 and only information in the server that relates to the task that the user was attempting to perform. There are situations wherein more than one organization shares a common server machine. There the access granted to the service desk representative is not just access to the machine but only to certain information and resources on the machine depending on the user that filed the incident report.

Now that the service desk representative has the capability to access to the user information, in step 512, the service desk representative accesses the machine and begins to perform the diagnostic tasks in order to detect the problem. The representative then detects the problem and provides a solution to the problem. At the completion of the service, in step 514 the service desk representative notifies the user and gets user verification that the service desk representative has resolved the problem. Once there has been user verification of the resolution of the problem, step 516 closes the access of the service desk representative to the user information and resources.

Figure 6:
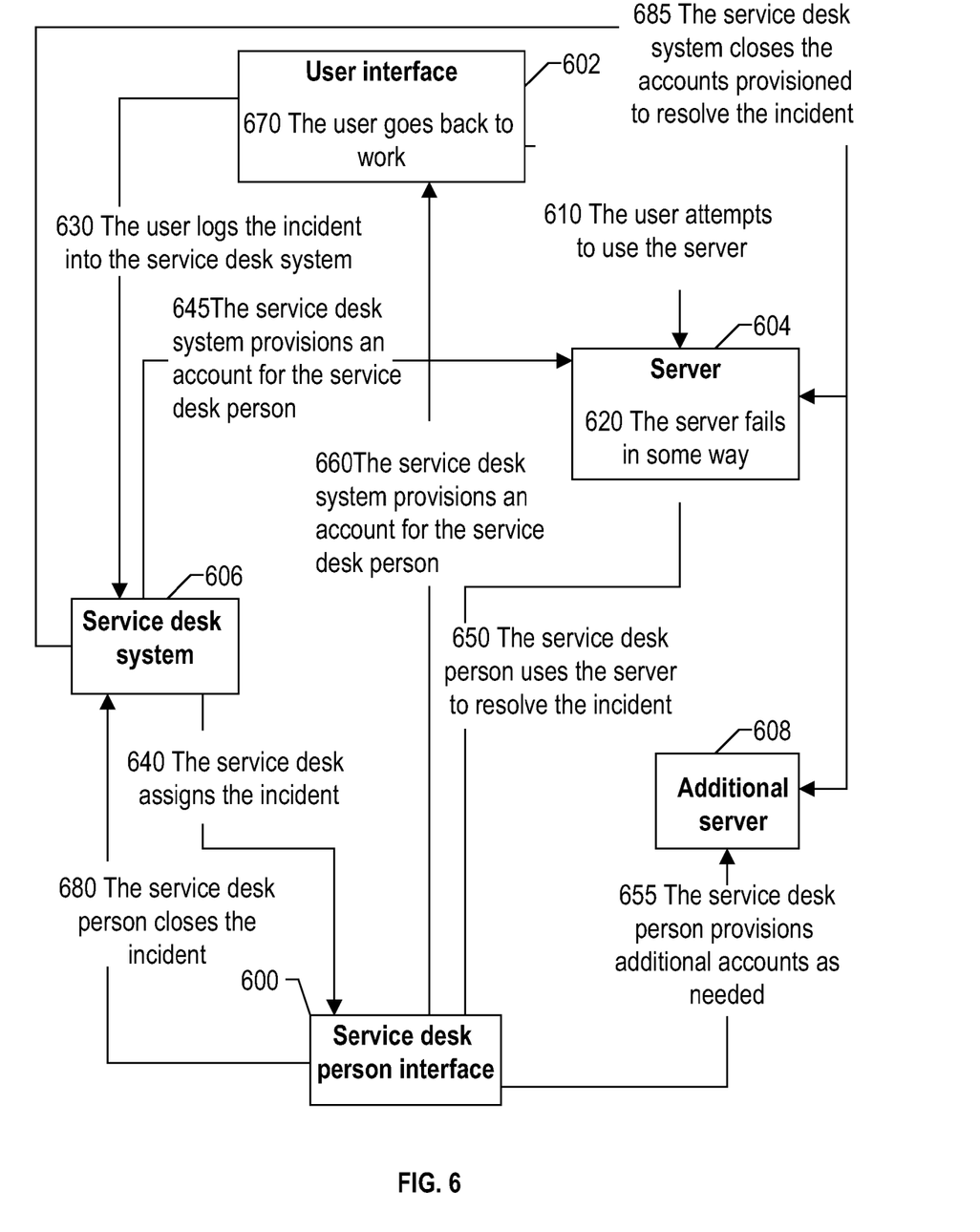
FIG. 6 is a service desk configuration illustrating the interaction between components of a service desk system in accordance with the present invention.

FIG. 6 is a service desk configuration illustrating the interaction between components of a service desk system in accordance with the present invention. This implementation addresses the potential security problems associated with constant access to system servers and user information even when there is no pending incident report to address. As with FIG. 4, this configuration comprises a service desk person interface 600 and a user interface 602. Through these interfaces, such as the computer device illustrated in FIG. 1, the user and the service desk personnel can interact on the service desk system of the present invention. Also shown in this system configuration are a server 604, and the service desk system module 606. This module serves as an interface between the user and the service desk person. This service desk module 606 can contain database having information about each computing device in the computing system, each user that can access a device in the computing system and information about security policies the define which users can access which computing devices and any privileges of a user when accessing a computing device. The service desk module can also have processes capable of assigning reported incidences to a service desk representative. The module can have processes that are capable of opening and closing access to computing resources that a service desk representative needs to resolve a reported computer problem. The system can also have an additional server 608. In some instances, there may be a need to access additional resources to resolve an incident. These additional resources may be located on another server machine.

Still referring to FIG. 6, the activities that occur in this process are illustrated in view of the system components. In the first action 610, the user attempts to use server 604 to perform some task. The result of this attempt is a failure of the task 620. The server fails in some way (does not give permission, is too slow, etc.). To resolve this failure problem, the user creates an incident report and logs the incident report into the service desk system 630 (via phone call, e-mail, Web form, etc.). The creation of this incident report could be done prior to accessing the service desk system or it could be created interactively in the service desk system module 606. The automated system then assigns the incident to a service desk representative 640. The automated system then establishes access for the service desk representative, in 645, by provisioning an administrative account on the appropriate server to the service desk person. Audit records are created which associate the administrative account provisioning to the service desk incident number. At this point, 650, the service desk representative accesses the server to resolve the incident. If necessary (for example, because the user did not identify the problem server correctly), the service desk person creates additional accounts for him/herself 655 on an additional server machine 608. This step has to be audited well, and have reasonable restrictions (while doing an incident in organization A, you can't create accounts in organization B). Audit records are created which associate the administrative account provisioning to this service desk incident number. After the service representative has resolved the matter, the service desk representative has the user verify that the incident has been resolved, in action 660. With this verification that the problem has been resolved, the user goes back to work 670. At this point, the service desk person closes the incident in action 680. Finally, in 685 the automated system closes the accounts provisioned in step 645 and 655. Audit records are created which show the destruction of the administrative account(s). This means that instead of accounts being provisioned all the time, they will only be available when they are actually needed by the service desk. This also ensures that each service desk representative will have his or her own account when it is needed (as opposed to a generic account, or account sharing practiced to save the time and hassle of getting approvals for additional accounts).

Figure 7:
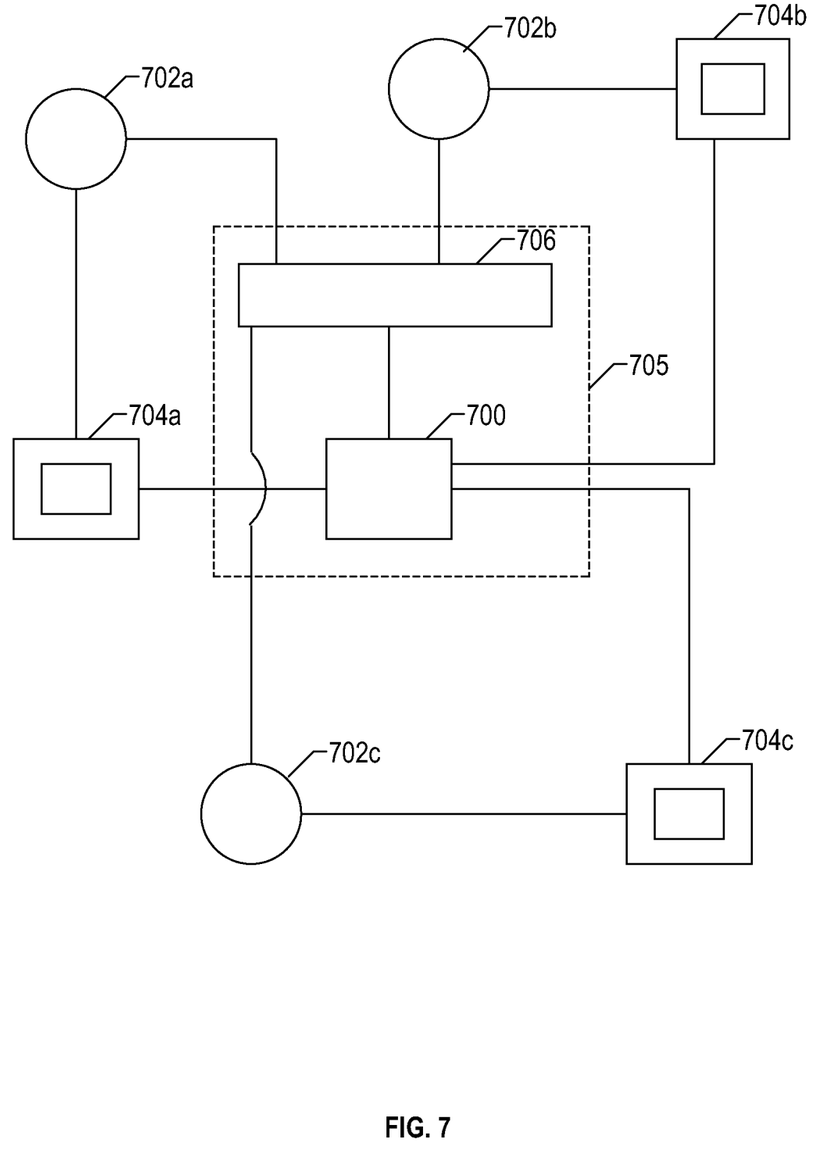
FIG. 7 is a service desk configuration of the present invention illustrating a service desk representative that is responsible for assisting multiple users connected to multiple server machines.

FIG. 7 is a service desk configuration of the present invention illustrating a service desk representative that is responsible for assisting multiple users connected to multiple server machines. The configuration for this system illustrates multiple users and multiple machines that are serviced by one service desk representative. As shown in this configuration, a service desk representative can have access to information of different organizations and users within the organizations. In this configuration, the service desk representative 700 connects to users 702*a*, 702*b* and 702*c* via a service desk system interface 706. The service desk interface 706 and service desk representative 700 for the service desk system component 705 of the configuration. The users also connect to corresponding machines (servers) 704*a*, 704*b* and 704*c*. The service desk representative also connects to machines 704*a*, 704*b*, and 704*c*. The operation of this configuration is similar to the operations of the configuration described in FIG. 6. The process of determining access to a particular machine will consider the user, and the task that the user was attempting to perform. FIG. 7 illustrates the necessity for limiting the access of a service representative only to resources that are needed to address the particular problem of a particular user.

It is important to note that while the present invention has been described in the context of a fully functioning data processing system, those skilled in the art will appreciate that the processes of the present invention are capable of being distributed in the form of instructions in a computer readable storage medium. Examples of computer readable media include media such as EPROM, ROM, tape, paper, floppy disc, hard disk drive, RAM, and CD-ROMs.

We claim:

1. An automated method for increasing security of accounts in a computing system designed to assist users encountering problems when attempting to perform computer-related task comprising the steps of:
   initially setting administrative accounts in the computing system to a closed state;
   detecting a problem with an attempt of a user to perform a task;
   assigning the detected problem to a service desk personnel;
   defining one or more administrative accounts that will be accessible by the service desk personnel in order to resolve the detected problem;
   opening the defined one or more administrative accounts for access by the service desk personnel in order to resolve the detected problem;
   determining when the service desk personnel has generated a resolution to the detected problem; and
   closing access to the one or more administrative accounts, which had been opened to enable the service desk personnel to resolve the detected problem.

2. The method as described in claim 1 wherein said problem detecting step further receiving an incident report containing an identification of the user.

3. The method as described in claim 1 wherein said problem-detecting step further comprises interactively receiving information from the user encountering a problem when attempting to perform a task.

4. The method as described in claim 1 further comprising before said problem detecting step, the step of creating a database containing information about each computing device in the computing system, each user that can access a device in the computing system and information about security policies the define which users can access which computing devices and any privileges of a user when accessing a computing device.

5. The method as described in claim 1 further comprising after said problem detecting step, the step of identifying the task the user was attempting to perform.

6. The method as described in claim 1 further comprising before said verification receiving step, the step of informing the user of a generated solution to the identified problem.

7. The method as described in claim 1 wherein said accounting opening step further comprises the step of creating an administrative account based on real-time need as defined by service desk processes.

8. The computer program product as described in claim 1 further comprising instructions for incorporating received information into an incident report and instructions for identifying the task the user was attempting to perform based on information contained in the incident report.

9. The method as described in claim 5 further comprising the step of identifying all system resources needed for the user to perform the desired task.

10. The method as described in claim 9 further comprising before said verification receiving step, the step of determining whether additional computing resources are needed to generate a resolution to the identified problem.

11. The method as described in claim 10 further comprising when the determination is that additional resources are needed, the step opening access for the service desk personnel to the identified additional resources.

12. The method as described in claim 7 wherein said access closing step further comprises the step of deleting one or more administrative accounts as identified by service desk processes.

13. An automated method for increasing security of accounts in a computing system designed to assist users encountering problems when attempting to perform computer-related task comprising the steps of:
    detecting a problem with an attempt of a first user to perform a task;
    assigning the detected problem to a second user;
    determining one or more computer resources, which need to be accessed to resolve the detected problem;
    granting access to the one or more computer resources to the second user;
    determining when a resolution to the detected problem has been resolved; and
    revoking access to the one or more computer resources to the second user in response to the resolution of the detected problem.

14. An A computer program product in a computer readable storage medium for increasing security of accounts in a computing system that is designed to assist users encountering problems when attempting to perform computer-related task comprising:
    instructions initially setting administrative accounts in the computing system to a closed state;
    instructions detecting a problem with an attempt of a user to perform a task;
    instructions assigning the detected problem to a service desk personnel;
    instructions defining one or more administrative accounts that will be accessible by the service desk personnel in order to resolve the detected problem;
    instructions opening the defined one or more administrative accounts for access by the service desk personnel in order to resolve the detected problem;
    instructions determining when the service desk personnel have generated a resolution to the detected problem;
    instructions receiving verification from the user that the problem has been resolved; and
    instructions closing access to the one or more administrative accounts opened to enabled the service desk personnel to resolve the detected problem.

15. The computer program product as described in claim 14 further comprising before said problem detecting instructions, instructions for creating a database containing information about each computing device in the computing system, each user that can access a device in the computing system and information about security policies the define which users can access which computing devices and any privileges of a user when accessing a computing device.

16. The computer program product as described in claim 8 further comprising instructions for identifying all system resources needed for the user to perform the desired task.

17. The computer program product as described in claim 16 further comprising before said verification receiving instructions, instructions for determining whether additional computing resources are needed to generate a resolution to the identified problem.

* * * * *